(12) United States Patent
Rho et al.

(10) Patent No.: US 11,083,267 B2
(45) Date of Patent: Aug. 10, 2021

(54) PORTABLE ARTICLE CONTAINER

(71) Applicant: AMOGREENTECH CO., LTD., Gyeonggi-do (KR)

(72) Inventors: Seung Yun Rho, Gyeonggi-do (KR); Won Gil Choi, Gyeonggi-do (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/702,953

(22) Filed: Dec. 4, 2019

(65) Prior Publication Data

US 2020/0100576 A1    Apr. 2, 2020

Related U.S. Application Data

(62) Division of application No. 15/556,610, filed as application No. PCT/KR2016/002399 on Mar. 10, 2016, now abandoned.

(30) Foreign Application Priority Data

| Mar. 10, 2015 | (KR) | 10-2015-0033332 |
| Sep. 1, 2015 | (KR) | 10-2015-0123747 |

(51) Int. Cl.
| *A45C 15/00* | (2006.01) |
| *H02J 7/34* | (2006.01) |
| *H02J 50/12* | (2016.01) |
| *H02J 7/02* | (2016.01) |
(Continued)

(52) U.S. Cl.
CPC .............. *A45C 15/00* (2013.01); *H02J 7/025* (2013.01); *H02J 7/342* (2020.01); *H02J 50/12* (2016.02); *A45C 3/02* (2013.01); *A45C 3/06* (2013.01)

(58) Field of Classification Search
CPC ... A45C 15/00; A45C 3/02; A45C 3/06; H02J 50/12
See application file for complete search history.

(56) References Cited

U.S. PATENT DOCUMENTS

| 6,870,089 B1 | 3/2005 | Gray |
| 8,729,737 B2 | 5/2014 | Schatz et al. |
| 8,912,687 B2 | 12/2014 | Kesler et al. |
(Continued)

FOREIGN PATENT DOCUMENTS

| CN | 102318161 A | 1/2012 |
| CN | 102959760 A | 3/2013 |
(Continued)

OTHER PUBLICATIONS

International Search Authority/KR, International Search Report dated Jul. 14, 2016 in International Patent Application No. PCT/KR2016/0023991 (with English translation), 6 pages.

*Primary Examiner* — Derek J Battisti
(74) *Attorney, Agent, or Firm* — Masuvalley & Partners

(57) ABSTRACT

Provided is a portable article container. The portable article container according to one embodiment of the present invention includes: a accommodation main body which is portable and includes an accommodation portion configured to accommodate an article; a battery configured to provide power to charge a main battery of a portable electronic device; and at least one charging unit configured to transmit power stored in the battery to the portable electronic device through at least one method of a wireless method and a wired method.

4 Claims, 13 Drawing Sheets

(51) Int. Cl.
*A45C 3/02* (2006.01)
*A45C 3/06* (2006.01)

(56) References Cited

U.S. PATENT DOCUMENTS

| | | | |
|---|---|---|---|
| 9,143,000 B2* | 9/2015 | Leabman | H02J 50/80 |
| 9,843,217 B2 | 12/2017 | Atasoy et al. | |
| 9,843,230 B2 | 12/2017 | John et al. | |
| 9,859,535 B2* | 1/2018 | Iseri | H01M 2/021 |
| 2005/0084749 A1 | 4/2005 | Hwang et al. | |
| 2010/0201312 A1* | 8/2010 | Kirby | H02J 50/12 |
| | | | 320/108 |
| 2011/0315284 A1 | 12/2011 | Hause et al. | |
| 2013/0101884 A1* | 4/2013 | Ueda | H01M 10/052 |
| | | | 429/127 |
| 2014/0000771 A1 | 1/2014 | Sherman et al. | |
| 2015/0138699 A1* | 5/2015 | Yamazaki | G06F 1/1641 |
| | | | 361/679.03 |
| 2015/0207167 A1* | 7/2015 | Ueda | H01M 10/0436 |
| | | | 429/127 |
| 2016/0190817 A1 | 6/2016 | Hartelt et al. | |
| 2016/0254500 A1* | 9/2016 | Kawata | H01M 2/1094 |
| | | | 362/157 |

FOREIGN PATENT DOCUMENTS

| | | |
|---|---|---|
| JP | 10-137025 A | 5/1998 |
| JP | 10-146213 A | 6/1998 |
| JP | 2006-296176 A | 10/2006 |
| JP | 4819399 B | 11/2011 |
| KR | 20-0414158 Y | 4/2006 |
| KR | 10-2006-0113069 A | 11/2006 |
| KR | 10-2011-0114703 A | 10/2011 |
| KR | 10-2014-0138818 A | 12/2014 |
| WO | 2012/140709 A1 | 10/2012 |

* cited by examiner

PORTABLE ARTICLE CONTAINER

RELATED APPLICATIONS

The present application is a divisional of U.S. patent application Ser. No. 15/556,610 filed Sep. 7, 2017 entitled Portable Article Container, which is the U.S. National Phase of and claims priority to International Patent Application No. PCT/KR2016/002399 filed Mar. 10, 2016, which claims priority to Korean Patent Application No. 10-2015-0123747 filed Sep. 1, 2015 and Korean Patent Application No. 10-2015-0033332 filed Mar. 10, 2015; all of which are incorporated herein by reference in their entireties.

TECHNICAL FIELD

The present invention relates to a portable article container capable of receiving and carrying articles, and more particularly, to a portable article container capable of charging a main battery of a portable electronic device such as a mobile phone or a wearable device such as a smart watch in an emergency.

BACKGROUND ART

Nowadays, as portable terminals have been miniaturized and slimmed, capacities of batteries embedded in the portable terminals itself are limited. As one example, a use time of a smartphone, which is a kind of portable terminal, is gradually increasing because various additional functions such as a search function, a financial management function, and a video playback function are embedded in the smartphone in addition to a basic communication function.

Accordingly, the battery of the portable terminal itself is frequently unable to last one day due to a capacity limitation thereof. Thus, the battery has to be replaced at least one time a day or is required to be continuously charged through a charging cable.

However, in the case in which it is difficult to charge the portable terminal using the charging cable, for example, during a long business trip or vacation, there is a problem in that the battery of the portable terminal is completely exhausted and thus the portable terminal is turned off.

Particularly, since a recent smartphone is manufactured as a battery integrated type (built-in type) smartphone in which a battery cannot be replaced, it is a common practice to purchase and carry an auxiliary battery for charging which can charge the battery in an emergency.

However, there are problems in that charging through a charging cable may be impossible depending on a surrounding environment, and it is difficult to carry a conventional auxiliary battery for charging. A portable electronic device such as a tablet and a portable multimedia player (PMP) also suffer the above problems.

Accordingly, a method in which a main battery of a portable electronic device is easily charged regardless of a location is urgently required.

DISCLOSURE

Technical Problem

The present invention is directed to providing a portable article container capable of extending a use time of a portable electronic device by a battery being embedded in a portable container such as a bag to simply charge a main battery of a portable electronic device at anytime and anyplace without a user having to carry a separate conventional auxiliary charging battery.

The present invention is also directed to providing a portable article container capable of being used for all portable electronic devices regardless of a kind thereof since power of a battery embedded in the container may be supplied to a portable electronic device in a wired or wireless method.

The present invention is also directed to providing a portable article container capable of preventing damage to a battery since the battery is formed as a thin flexible battery having a pattern for contraction and relaxation to flexibly cope with deformation even when the container is formed of a flexible material and deformation thereof occurs.

The present invention is also directed to providing a portable article container capable of being thinned and charging a battery since one wireless power transfer antenna is used in a wireless power transmitting mode or a wireless power receiving mode according to a purpose of use.

Technical Solution

One aspect of the present invention provides a portable article container including: a accommodation main body which is portable and includes an accommodation portion configured to accommodate an article; a battery configured to provide power to charge a main battery of a portable electronic device; and at least one charging unit configured to transmit power stored in the battery to the portable electronic device through at least one method of a wireless method and a wired method.

The accommodation main body may be a bag body including one among a hiking bag, a backpack, a handbag, a briefcase, and a bookbag.

The charging unit may be a connection port electrically connected to a circuit portion, and the portable electronic device may be electrically connected to the connection port through a charging cable to charge the main battery.

As another example, the charging unit may be a wireless power transfer antenna configured to transmit wireless power for charging the main battery of the portable electronic device by using the power supplied from the battery, and the wireless power transfer antenna may serve as a wireless power transmitting antenna configured to charge the main battery of the portable electronic device by using the power stored in the battery by being used as the wireless power transmitting antenna, and as a wireless power receiving antenna configured to receive wireless power supplied from an external charging device to charge the battery.

In addition, the portable article container may further include a device accommodation member which has an accommodation space configured to accommodate the portable electronic device and is disposed in the accommodation portion, wherein the battery and the charging unit may be embedded in the device accommodation member, and the device accommodation member may be formed as a pouch type accommodation member.

Meanwhile, another aspect of the present invention provides a portable article container including: a accommodation main body having an accommodation portion configured to accommodate an article; a flexible battery configured to supply power to charge a main battery of a portable electronic device; a wireless power transfer antenna which serves as an antenna configured to transmit or receive wireless power; and a circuit portion configured to control driving of the wireless power transfer antenna, wherein the wireless power transfer antenna uses one antenna to receive wireless power supplied from an outside to charge power of the battery or to transmit the power stored in the battery to charge the main battery of the portable electronic device through a wireless method.

Advantageous Effects

According to the present invention, since a main battery of a portable electronic device can be charged in addition to an inherent function of storing an article being performed, the portable electronic device can be charged regardless of place, and thus a use time of the portable electronic device can be increased.

Since power of an embedded battery can be supplied to a portable electronic device through a wired and wireless method, the present invention can be applied to all portable electronic devices regardless of a kind thereof.

In addition, according to the present invention, in the case in which a battery is formed as a flexible battery, since a pattern for contraction and relaxation is formed in the flexible battery, the battery can flexibly cope with deformation of the container even when a container is formed of a flexible material, and thus damage and performance degradation of the battery can be prevented.

DESCRIPTION OF DRAWINGS

FIG. 11 is a view illustrating examples of various shapes of a accommodation main body which may be applied to the portable article container according to the present invention, wherein FIG. 11A is a view illustrating the case in which the accommodation main body is a handbag, FIG. 11B is a view illustration the case in which the accommodation main body is a carry-on bag, and FIG. 11C is a view illustrating the case in which the accommodation main body is a backpack.

FIGS. 15A and 15B are graphs showing performance of a flexible battery applicable to the portable article container according to the present invention, wherein FIG. 15A is a graph showing a change in battery capacity before and after the battery is bent, and FIG. 15B is a graph showing a change in battery voltage over time in the case in which an external force is momentarily applied to a bent portion.

MODES OF THE INVENTION

Figure 1:
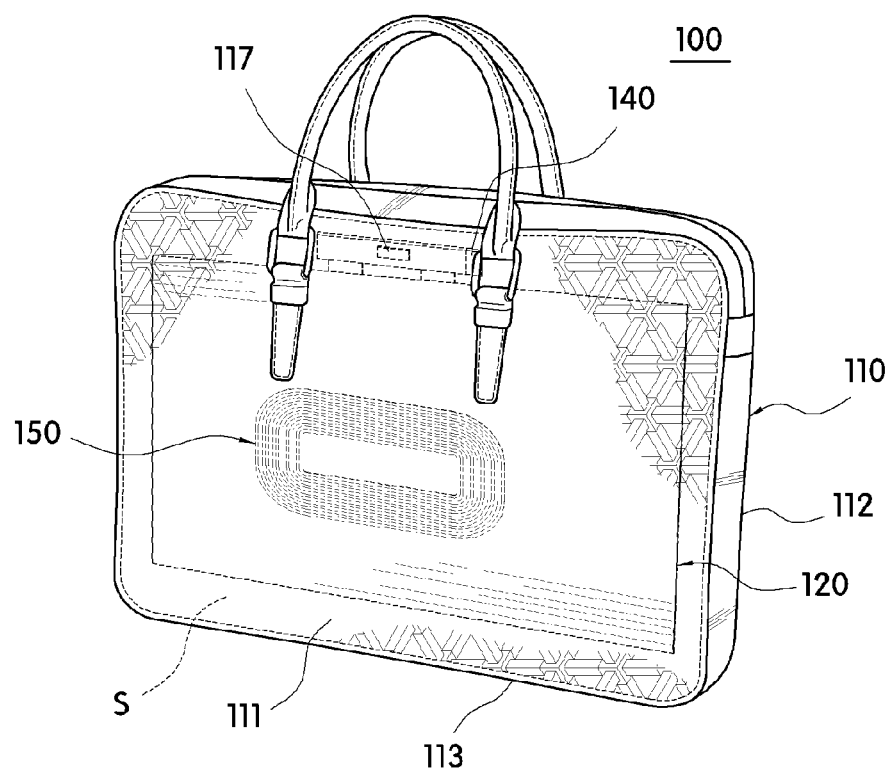
FIG. 1 is a view illustrating a portable article container according to one embodiment of the present invention.

Hereinafter, embodiments of the present invention that may be easily performed by those skilled in the art will be described in detail with reference to the accompanying drawings. However, the embodiments of the present invention may be implemented in several different forms and are not limited to the embodiments described herein. In addition, parts irrelevant to the description are omitted in the drawings in order to clearly explain the embodiments of the present invention. Similar parts are denoted by similar reference numerals throughout this specification.

Figure 8:
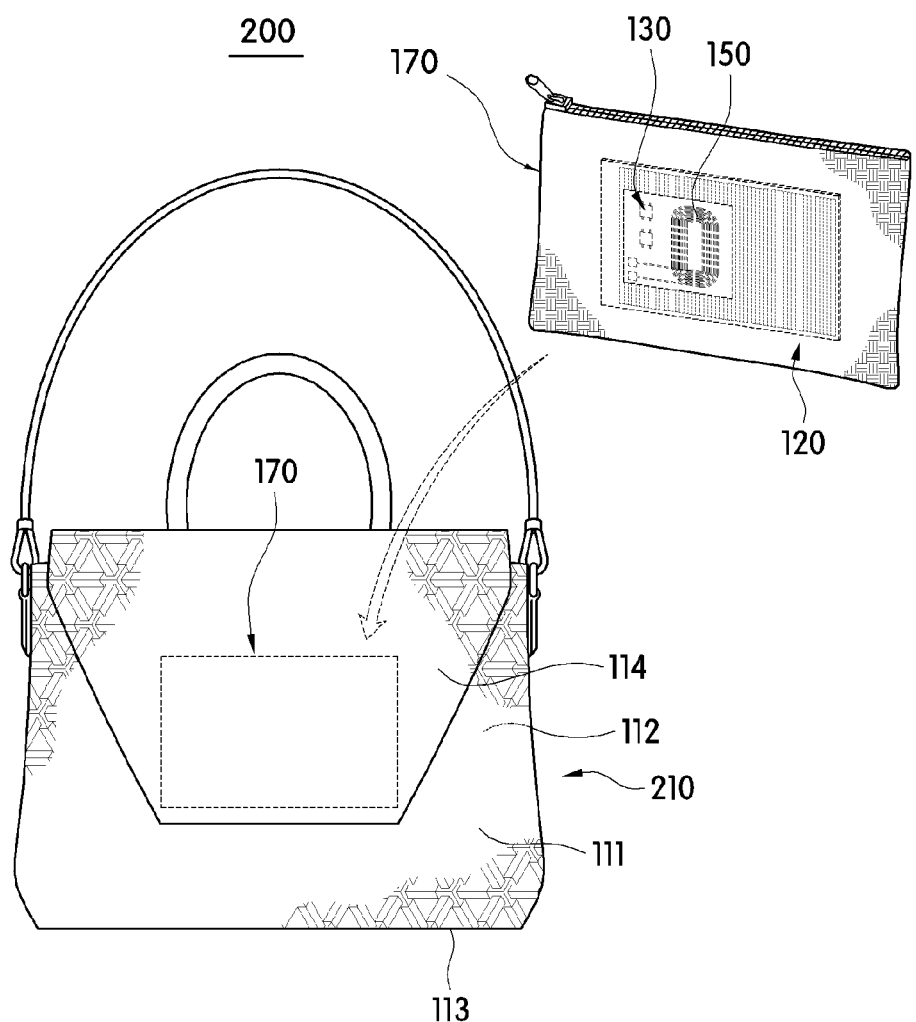
FIG. 8 is a view illustrating a portable article container according to another embodiment of the present invention.

As illustrated in FIGS. 1 and 8, portable article containers 100 and 200 according to one embodiment of the present invention include accommodation main bodies 110 and 210, a battery 120, and a charging unit.

The accommodation main bodies 110 and 210 are for storing and carrying articles including various personal items or portable items such as documents, cosmetics, portable terminals and the like.

To this end, each of the accommodation main bodies 110 and 210 includes a front portion 111, a rear portion 112, and a bottom portion 113, which form an exterior thereof, and an accommodation portion S for storing articles is formed by the front portion 111, the rear portion 112, and the bottom portion 113.

That is, the accommodation portion S provides a space for accommodating or storing articles, the front portion 111 and the rear portion 112 may be connected through the bottom portion 113 to form a space having one open side, and the space may also be divided into a plurality of spaces by partitions.

In this case, the front portion 111, the rear portion 112, and the bottom portion 113 forming each of the accommodation main bodies 110 and 210 may be formed as a single member, and each of the accommodation main bodies 110 and 210 may be formed in a form in which an inner skin and an outer skin thereof are laminated.

The front portion 111, the rear portion 112, and the bottom portion 113 of each of the accommodation main bodies 110 and 210 may be formed of a soft material such as leather, a fabric, a synthetic fiber and the like.

Figure 7:
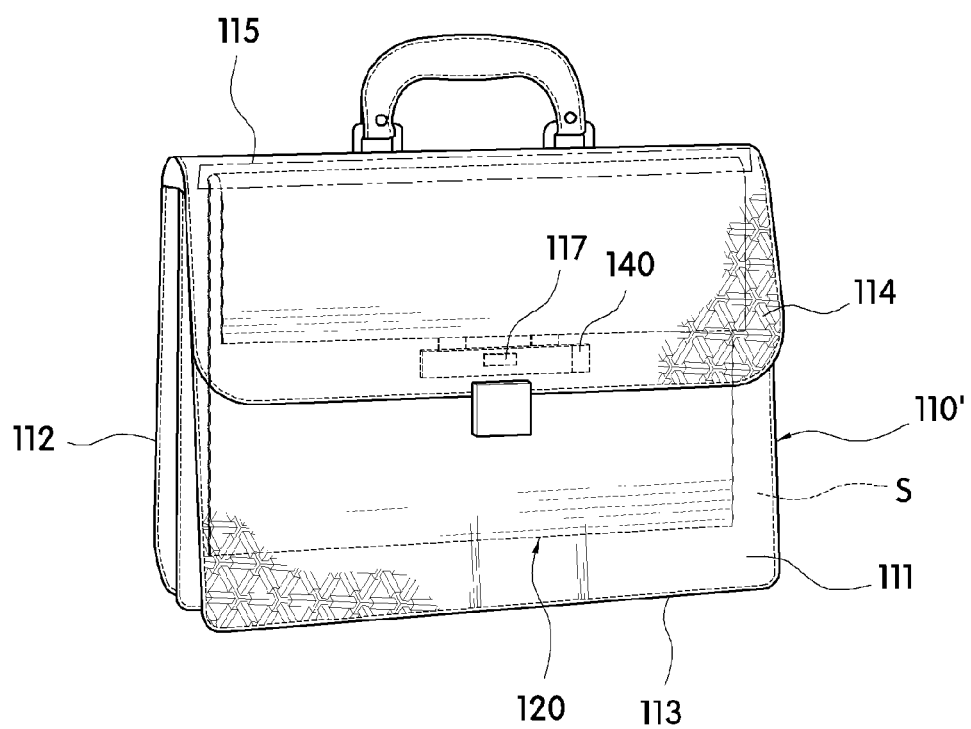
FIG. 7 is a view illustrating a form of a battery in the case in which the portable article container according to one embodiment of the present invention includes a cover portion.

In addition, as illustrated in FIG. 7, a accommodation main body 110' may have a form including a cover portion 114 which extends from the rear portion 112 or the front portion 111, but preferably extending from the rear portion 112, and covers an open upper portion of the accommodation portion S and a portion or the entirety of the front portion 111.

In this case, the accommodation portion S may be understood as one of forms of accommodation portion configured to provide a space for accommodating articles and may be formed in various known forms of accommodation portion as long as a space is formed for accommodating articles.

Figure 11:
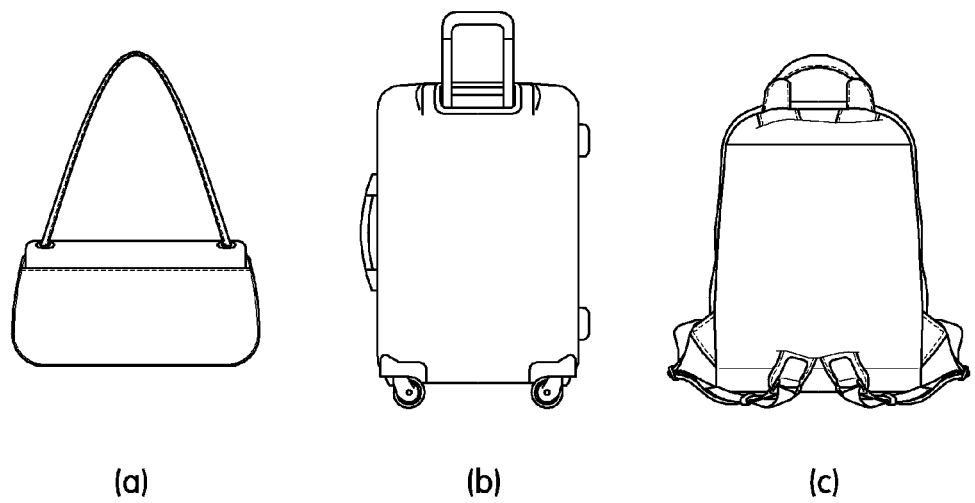

In this case, each of the accommodation main bodies 110 and 210 may be a known main bag body. That is, each of the accommodation main bodies 110 and 210 may be a known briefcase, or a book bag, as illustrated in FIG. 1, may be a type of handbag including a shoulder bag, a cross bag, a clutch bag, a tote bag, and the like (see FIGS. 8 and 11A), a type of a carry-on bag (see FIG. 11B), or a type of hiking bag or backpack 410 (see FIG. 11C). However, each of the accommodation main bodies 110 and 210 is not limited to such a main bag body and may have any form as long as each of the accommodation main bodies 110 and 210 includes an accommodation portion for accommodating articles and articles may be carried in a state in which the articles are accommodated in the accommodation portion.

Here, each of the portable article containers 100 and 200 according to the present invention includes the battery 120 configured to provide power for charging a main battery of a portable electronic device 10 by using at least one method of a wired charging method and a wireless charging method.

That is, each of the portable article container 100 and 200 according to one embodiment of the present invention may also serve as a portable auxiliary battery configured to provide charging power by supplying power which may charge a main battery of a portable electronic device in an emergency through the battery 120 in addition to performing an inherent function of a container configured to easily carry accommodated articles. Here, the portable electronic device may be a portable phone, a smart phone, a portable multimedia player (PMP), a digital multimedia broadcasting (DMB) device, a tablet, and the like.

Accordingly, in the case in which a main battery of a portable electronic device needs to be charged, since the charging may be performed by using power of the battery 120, the main battery of the portable electronic device can be easily charged regardless of location.

Figure 9:
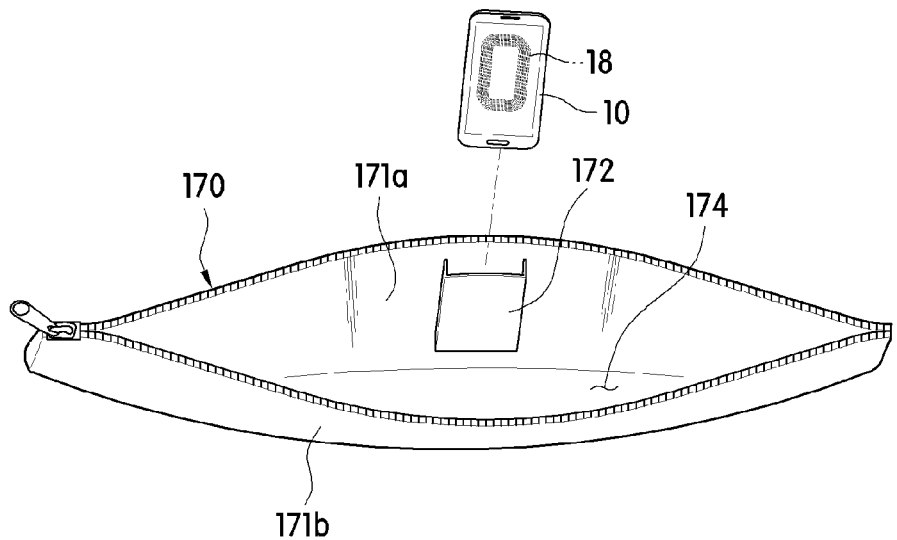
FIG. 9 is a view illustrating a device fixing member applied to the portable article container of FIG. 8.
Figure 10:
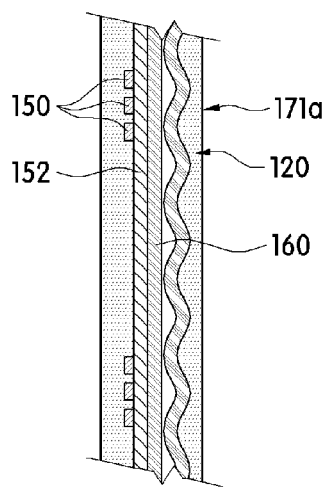
FIG. 10 is a partial cross-sectional view illustrating an arrangement relation of a battery, a wireless power transfer antenna, and a shielding sheet in FIG. 9.

In this case, as illustrated in FIG. 1, the battery 120 may be embedded in the accommodation main body 110, or, as illustrated in FIGS. 8 to 10, the battery 120 may be embedded in a separate device accommodation member 170.

Here, although any known battery may be applied as the battery 120, a flexible battery having flexibility may be used as the battery 120 to reduce a total weight and to achieve thinning. In addition, in the case in which the battery 120 is formed as a flexible battery, although the accommodation main body 110 and the device accommodation member 170 are formed of a flexible material, and the deformation occurs due to an external force while the accommodation main body 110 and the device accommodation member 170 is used, the battery 120 may be flexibly deformed against deformation of the main bag body 110 and the device accommodation member 170, and thus damage or performance degradation of the batter 120 may be prevented.

As one example, in the case in which the battery 120 is formed as a flexible battery and embedded in the accommodation main body 110, the flexible battery may be embedded in at least one place among the front portion 111, the rear portion 112, and the bottom portion 113 having a predetermined area. Accordingly, since the flexible battery may have a wide area corresponding to an area of the front portion 111, the rear portion 112, or the bottom portion 113, the battery 120 can have high capacity.

In addition, in the case in which the flexible battery is embedded in a plurality of places among the front portion 111, the rear portion 112, and the bottom portion 113 of the accommodation main body 110, a plurality of flexible batteries identical to the flexible battery may be provided to be embedded in the places one to one, and may also be integrally formed. In addition, in the case in which the accommodation main body 110' includes the cover portion 114, the flexible battery may even be embedded in the cover portion 114 (see FIG. 7).

That is, the battery 120 may be formed as flexible batteries integrally formed and embedded in all of the front portion 111, the rear portion 112, and the bottom portion 113, and may also be formed to be embedded in both the rear portion 112 and the cover portion 114.

As another example, the battery 120 may be embedded in the device accommodation member 170. Here, the device accommodation member 170 is disposed in the accommodation portion S of the accommodation main body 210, provides an accommodation space 174 for accommodating the portable electronic device 10 to be charged, and serves as an auxiliary battery for charging the main battery of the portable electronic device 10.

To this end, as illustrated in FIG. 9, the device accommodation member 170 includes the accommodation space 174, and the battery 120 configured to provide power for charging the main battery of the portable electronic device may be embedded in the device accommodation member 170.

That is, in the case in which the portable article container 200 according to one embodiment of the present invention includes the device accommodation member 170, the accommodation main body 210 performs an inherent function of accommodating articles and the device accommodation member 170 serves as an auxiliary battery for charging the main battery of the portable electronic device 10.

Here, in the case in which the battery 120 is embedded in the device accommodation member 170, power supplied from the battery 120 may be wirelessly transmitted to the portable electronic device 10 through a wireless power transfer antenna 150.

Accordingly, in a state in which the accommodation space 174 accommodates the portable electronic device 10 to be charged, the main battery of the portable electronic device 10 may be simply charged by using the power supplied from the battery 130.

The device accommodation member 170 may be formed of a soft material such as leather, a fabric, and the like, and may include a front portion 171a and a rear portion 171b to form the accommodation space 174 for accommodating the portable electronic device 10.

In this case, the battery 120 may be selectively embedded in one portion of the front portion 171a and the rear portion 171b, and may also be embedded in both the front portion 171a and the rear portion 171b.

As one example, since the battery 120 may be formed as a flexible battery and may have a wide area corresponding to at least one of the front portion 171a and the rear portion 171b of the device accommodation member 170, a total capacity of the battery 120 may be increased.

In addition, in the case in which a flexible battery is embedded in each of the front portion 171a and the rear portion 171b of the device accommodation member 170, the flexible battery embedded in the front portion 171a and the flexible battery embedded in the rear portion 171b may be provided as two members and may be electrically connected each other, or may also be integrally formed.

Meanwhile, in a state in which the device accommodation member 170 is disposed in the accommodation portion S, one side of the device accommodation member 170 may be connected to and integrally formed with the accommodation main body 210. In addition, in a state in which the device accommodation member 170 is disposed in the accommodation portion S, the device accommodation member 170 may be formed to be separable from the accommodation main body 210.

As one example, the device accommodation member 170 may be formed as a conventional pouch having the accommodation space 174, which may accommodate articles and the like, and may be inserted into the accommodation portion of the accommodation main body 210. Accordingly, as the device accommodation member 170 is separated from the accommodation main body 210 to be moved to another accommodation main body to use or only the device accommodation member 170 is separated from the accommodation main body 210 to be carried, ease of use and portability may be improved. In addition, as the battery 120 for supplying power to a portable electronic device is embedded in the separate device accommodation member 170, there is no need to change or damage an original shape of the accommodation main body 210. Particularly, in the case in which the accommodation main body 210 is a high price main bag body, since an original shape of the main bag body is not damaged, lowering of marketability may be prevented.

Here, the accommodation space 174 may be provided in a pocket form having an open upper side, or may also be provided in a form in which an open upper side is covered by a separate cover portion. In addition, the device accommodation member 170 may be formed as a single member, or may also be formed in a form in which an inner skin and an outer skin thereof are laminated.

In addition, the above described accommodation space 174 may be understood as one of forms of accommodation space configured to provide a space for storing articles including a portable electronic device and the like, and may be formed in various known forms of accommodation space as long as a space for storing articles is provided.

In this case, each of the portable article containers 100 and 200 according to one embodiment of the present invention includes at least one of charging units 140 and 150 for transmitting power of the battery 120 embedded in the main bag body 110 or the device accommodation member 170 to the main battery of the portable electronic device 10.

Here, the charging units may be a connection port 140 electrically connected to the portable electronic device 10 through a known charging cable, or the wireless power transfer antenna 150 for transmitting wireless power. In addition, the portable article container according to the present invention may include both the connection port 140 and the wireless power transfer antenna 150 such that a user may select a wireless charging method and a wired charging method (see FIG. 1), or may selectively include one of the connection port 140 and the wireless power transfer antenna 150 (see FIG. 8). In this case, the connection port 140 may be a known universal serial bus (USB) port type, and the connection port 140 may be formed to be exposed to an inside of the accommodation portion S to be easily connected to the portable electronic device 10 stored in the accommodation portion S through a charging cable.

Meanwhile, the connection port 140 and the wireless power transfer antenna 150 may be electrically connected to the circuit portion 130, and the circuit portion 130 is electrically connected to the battery 120.

The circuit portion 130 may include various circuits for converting power supplied from the battery 120 into alternative current (AC) power for wireless charging or into a voltage for wired charging and a protection circuit such as a protection circuit module (PCM) circuit for preventing overcharging.

Here, the circuit portion 130 may be realized as a form of circuit portion in which various circuit patterns for a wired charging circuit and/or a wireless charging circuit at least one a chipset or diode, and various passive elements are mounted on at least one surface of a circuit board.

In addition, the circuit portion 130 may include a voltage drop portion 134 configured to drop an output voltage supplied from the battery 120 to a voltage suitable for wired charging and supply the dropped voltage to the portable electronic device 10.

Meanwhile, the portable article container according to the present invention may include at least one switch 117 for switching a state of the circuit portion 130 or for supplying driving power to the circuit portion 130 (see FIG. 1).

As one example, the switch 117 may be provided at one side of the accommodation main body 110 to be electrically connected to the circuit portion 130, may switch the circuit portion 130 to a wired charging mode or a wireless charging mode by user operation, and may also include a non-charging mode.

In addition, in the case in which the wireless power transfer antenna 150 operates in both a receiving mode and a transmitting mode, the switch 117 may also change the wireless power transfer antenna 150 to the receiving mode or to the transmitting mode.

Specifically, in the case in which the main battery of the portable electronic device 10 is charged through a wired method, a user operates the switch 117 to switch the circuit portion 130 to the wired charging mode, and thus the main battery of the portable electronic device 10 may be charged by using power of the battery 120 supplied to the portable electronic device through the connection port 140.

In addition, in the case in which the main battery of the portable electronic device 10 is charged through the wireless method, the user operates the switch 117 to switch the circuit portion 130 to the wireless charging mode, and thus the main battery of the portable terminal 10 is charged by using power of the battery 120 supplied as wireless power through the wireless power transfer antenna 150.

In addition, in the case in which the main battery of the portable electronic device 10 does not have to be charged, the switch 117 switches the circuit portion 130 to the non-charging mode, and thus the accommodation main body 110 performs an inherent function for accommodating articles.

As is described above, in the portable article container according to the present invention, since a user may select the charging mode or the non-charging mode by operating the switch 117, the portable article container according to the present invention may be used as a portable auxiliary battery and may perform the inherent function of carrying articles.

In addition, in the case in which the portable electronic device 10 to be charged does not include a wireless power receiving antenna 18, charging is performed through the wired charging mode, and in the case in which the portable electronic device 10 includes the wireless power receiving antenna 18, the user may select the wired charging mode or the wireless charging mode, and thus the user may use any portable electronic device regardless of a kind thereof. Here, the switch 117 is illustrated as being operated through a button method, but the operation method is not limited thereto and the switch 117 may be operated through a sliding or rotating method and may be operated through various known methods as long as the charging mode is changeable through operation of a user.

Here, in the case in which the connection port 140 is connected to the portable electronic device through a charging cable, the battery 120 may supply power stored in the battery 120 to the portable electronic device 10 to charge the main battery of the portable electronic device without any specific operation, or, as described above, may supply the power stored in the battery 120 to the portable electronic device 10 only in the case in which a user operates the switch 117 to switch the circuit portion 130 to the wired charging mode.

Meanwhile, the wireless power transfer antenna 150 transmits wireless power to the wireless power receiving antenna 18 of the portable electronic device 10 to charge the main battery of the portable electronic device through the wireless method in the case in which the wireless power receiving antenna 18 is embedded in the portable electronic device 10.

In this case, the wireless power transfer antenna 150 and the battery 120 may be embedded in the accommodation main body 110 (see FIG. 1), or may also be embedded the device accommodation member 170 (see FIG. 8).

Here, the wireless power transfer antenna 150 may be formed as a flat type coil, in a circular shape, an elliptical shape, a spiral shape, or a polygonal shape such as a quadrangular shape, which is wound in a clockwise or counterclockwise direction, or may also be formed by etching a metal foil such as a copper foil or by printing a predetermined pattern using a conductive ink on at least one surface of a circuit board. In addition, in the case in which a pattern of the wireless power transfer antenna 150 is printed on a circuit board, the circuit board may be integrally formed with the circuit board on which the circuit portion 130 is formed, or the circuit boards may be formed as separate members.

The wireless power transfer antenna 150 serves as a wireless power transmitting antenna for transmitting wireless power to the wireless power receiving antenna 18 included in the portable electronic device 10 and is driven by control of the circuit portion 130.

Here, driving power of the circuit portion 130 for driving the wireless power transfer antenna 150 may use a part of the power stored in the battery 120.

That is, when power is supplied to the circuit portion 130 from the battery 120, the wireless power transfer antenna 150 may transmit wireless power by driving the circuit portion 130.

As one example, in the case in which power is supplied to the circuit portion 130, the power stored in the battery 120 may be converted into a predetermined voltage and current by a conversion portion 132, direct current (DC) power supplied from the battery 120 may be converted into AC power by an inverter portion 133, and wireless power may be transmitted through the wireless power transfer antenna 150.

Here, the circuit portion 130 may include a control portion 131 configured to generate a control signal for controlling overall operation of the portable article container and for adjusting characteristics of a frequency, an applied voltage and current, and the like used for generating a power signal transmitted from the wireless power transfer antenna 150, and the power signal may have at least one piece of information among information on an amount of power and charging state information of a portable terminal to be charged and power information suitable for a load required by the target to be charged and identification information.

Through this, the wireless power receiving antenna 18 included in the portable electronic device 10 generates power using a magnetic field transmitted from the wireless power transfer antenna 150 to charge the main battery of the portable electronic device 10.

Here, a principle of power transmission and reception using the wireless power transfer antenna 150 may be both of a known magnetic induction method and a magnetic resonance method in which an electromagnetic field is generated by using a coil and power is transmitted through the electromagnetic field. Since a wireless charging technology using the magnetic induction method and the magnetic resonance method is known technology, a detailed description thereof will be omitted. In addition, in the case in which the portable article container 100 according to the present invention includes both the wireless power transfer antenna 150 for wireless charging and the connection port 140 for wired charging as charging units, transmission of wireless power using the wireless power transfer antenna 150 may be performed when the circuit portion 130 is changed to the wireless charging mode by the switch 117 being operated, and in the case in which the portable article container according to the present invention includes only the wireless power transfer antenna 150 for wireless charging as a charging unit, the power stored in the battery 120 may be transmitted as a form of wireless power through the wireless power transfer antenna 150 by the circuit portion 130 when driving power is supplied to the circuit portion 130.

In this case, the portable article containers 100 and 200 according to the present invention may respectively include device fixing portions 116 and 172 for preventing movement of the portable electronic device 10. In the case in which the main battery of the portable electronic device is charged through the wireless method by using wireless power transmitted through the wireless power transfer antenna 150, as each of the device fixing portions 116 and 172 maintains a state in which the wireless power transfer antenna 150 and the wireless power receiving antenna 18 included in the portable electronic device are arranged, wireless charging may be smoothly performed.

Figure 6:
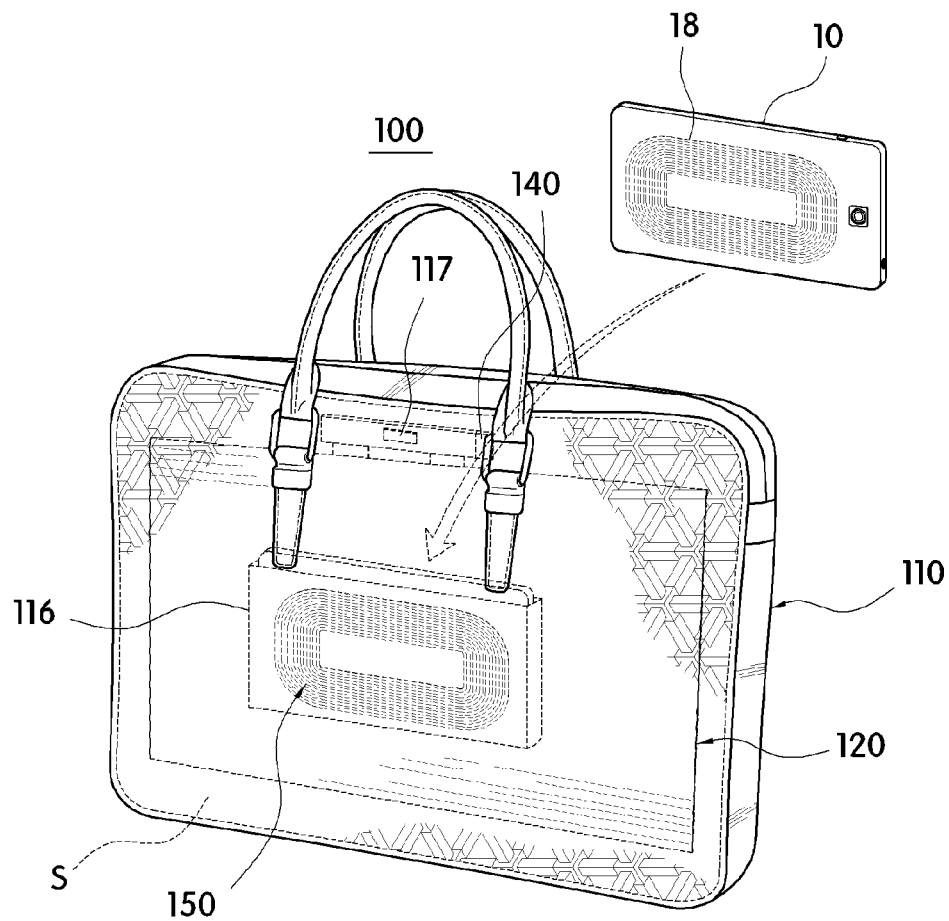
FIG. 6 is a view illustrating a usage state in which a portable electronic device is charged through the wireless method by using the portable article container according to one embodiment.

As one example, in the case in which the wireless power transfer antenna 150 and the battery 120 are embedded in the main bag body 110, the device fixing portion 116 may be provided inside the main bag body 110 (see FIG. 6), and in the case in which the wireless power transfer antenna 150 and the battery 120 are embedded in the device accommodation member 170, the device fixing portion 172 may be provided inside the device accommodation member 170 (see FIG. 9).

The device fixing portions 116 and 172 may be formed at a position corresponding to the wireless power transfer antenna 150 embedded in the main bag body 110 or the device accommodation member 170, and each of the device fixing portions 116 and 172 may be formed to have a size capable of accommodating the portable electronic device. As one example, each of the device fixing portions 116 and 172 may be formed to have at least one of the same approximate length and width as those of the portable electronic device, for example, a portable terminal.

Accordingly, when the portable electronic device to be charged is inserted into the device fixing portions 116 or 172, the wireless power receiving antenna 18 embedded in the portable electronic device 10 is disposed at a position corresponding to the wireless power transfer antenna 150 embedded in the main bag body 110 or the device accommodation member 170. In addition, as movement of the portable electronic device 10 is prevented by the device fixing portions 116 or 172, a state in which the wireless power transfer antenna 150 and the wireless power receiving antenna 18 embedded in the portable electronic device are arranged is maintained, and thus wireless charging may be smoothly performed.

Here, the device fixing portions 116 or 172 is illustrated as having a pocket type fixing portion as one example of a fixing portion for fixing a position of the portable electronic device 10, but the type not limited thereto, and various known types of fixing portions such as a band type fixing portion, an adhesive layer type fixing portion, a clip type fixing portion, and a Velcro type fixing portion may be applied thereas as long as the device fixing portions 116 or 172 has a form in which the portable electronic device is temporarily fixed to the position corresponding to the wireless power transfer antenna 150 or movement of the portable electronic device is prevented.

The battery 120 is embedded in the main bag body 110 to supply power for charging the main battery of the portable electronic device 10.

Figure 12:
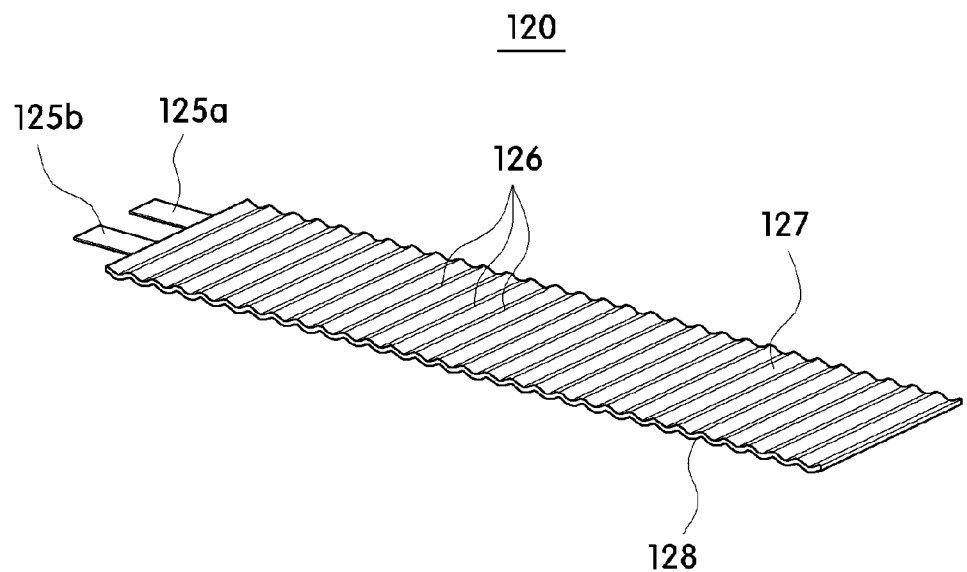
FIG. 12 is a view illustrating one form in which the battery applied to the portable article container according to the present invention is formed as a flexible battery.

Although the battery 120 may be provided as a known battery having rigidity, the battery may also be provided as a flexible battery having flexibility such that a total weight thereof is decreased, thinning is achieved, and a damage or performance degradation problem does not occur even when the accommodation main body 110 formed of a flexible material is deformed by an external force while being used (see FIG. 12).

Figure 13:
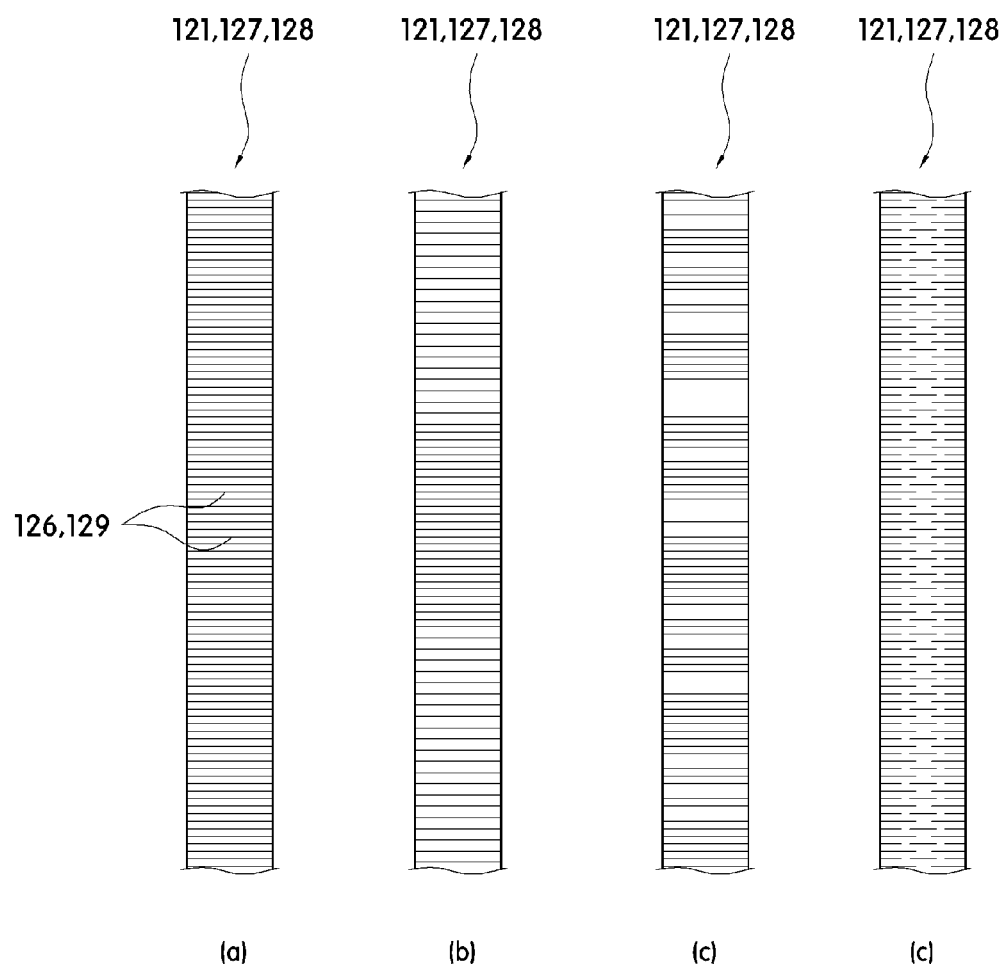
FIG. 13 is a schematic view illustrating various forms of patterns formed in an exterior member and an electrode assembly in FIG. 12.
Figure 14:
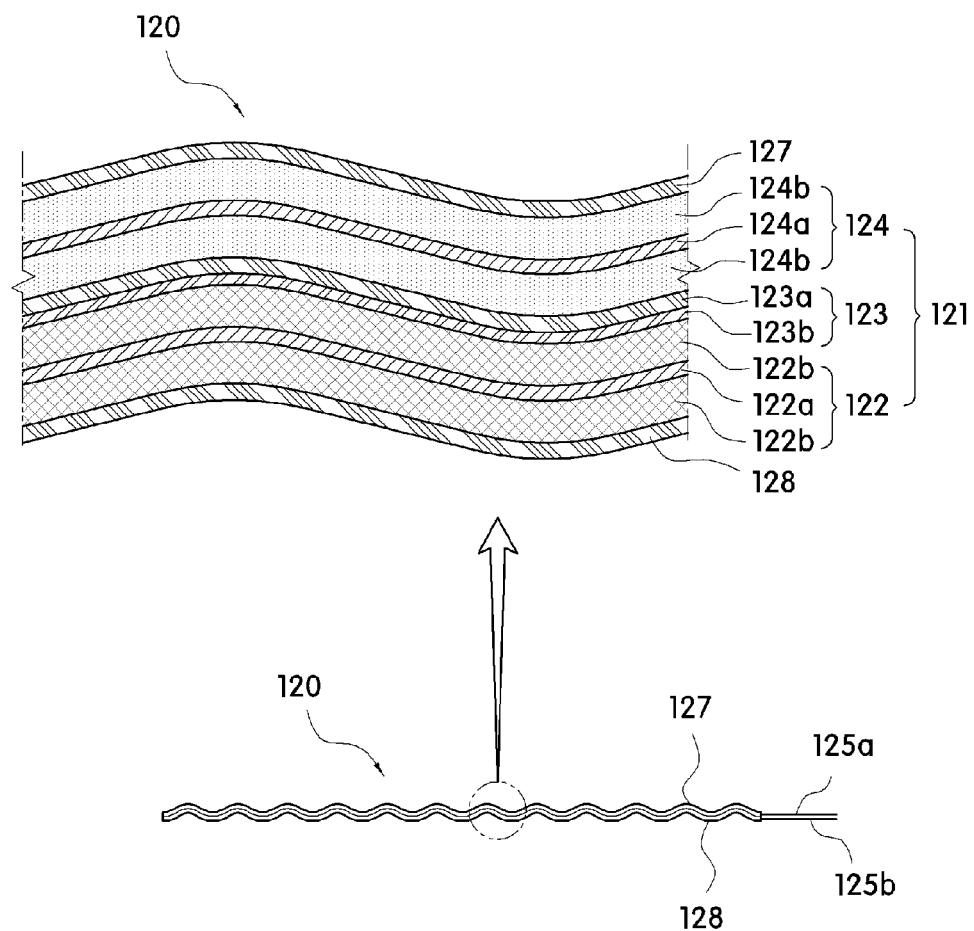
FIG. 14 is an enlarged cross-sectional view illustrating a detailed structure of FIG. 12.

That is, as illustrated in FIGS. 12 to 14, the flexible battery includes an electrode assembly 121 and exterior members 127 and 128, and the electrode assembly 121 and an electrolyte are encapsulated inside the exterior members 127 and 128.

In this case, each of the electrode assembly 121, the exterior member 127 and the exterior member 128 may include patterns 126 and 129 for contraction and relaxation. As one example, the patterns 126 and 129 for contraction and relaxation may be formed in a longitudinal or transverse direction of the electrode assembly 121 and the exterior members 127 and 128, and the first pattern 129 formed in the exterior members 127 and 128 may be formed in the same direction as the second pattern 126 formed in the electrode assembly 121 (see FIGS. 13 and 14).

Even when the accommodation main body 110 is deformed while being used, the patterns 126 and 129 cancel an amount of change generated due to a curvature generated by the deformation, and thus contraction or relaxation of the base material itself is prevented or minimized.

As one example, as the accommodation main body 110 or the device accommodation member 170 is formed of a flexible material, in the case in which deformation of the accommodation main body 110 or the device accommodation member 170 occurs while the accommodation main body 110 or the device accommodation member 170 is used, damage to the flexible battery embedded in the accommodation main body 110 or the device accommodation member 170 due to the deformation may be prevented. That is, since deformation of the base material itself forming the electrode assembly 121 and the exterior members 127 and 128 is prevented or minimized, an amount of deformation of the members which may be generated at a bent portion is minimized even when the accommodation main body 110 or the device accommodation member 170 is deformed, for example, when bending occurs, and thus damage to or performance degradation of the electrode assembly 121 and the exterior members 127 and 128 may be prevented.

In this case, the first pattern 129 and the second pattern 126 are disposed in the same direction and disposed to coincide with each other. This is so the first pattern 129 and the second pattern 126 always behave in the same manner.

In other words, in the case in which the battery 120 applied to the present invention is provided as a flexible battery, as the patterns 126 and 129 for contraction and relaxation generated in the longitudinal direction when the battery 120 is bent are formed to coincide with each other on the electrode assembly 121 and the exterior members 127 and 128, the electrode assembly 121 and the exterior members 127 and 128 maintain a uniform distance or a uniform contact state over an overall length thereof even when bending occurs in the longitudinal direction, and an electrolyte encapsulated along with the electrode assembly 121 is uniformly distributed over the overall length thereof, and thus performance degradation of the battery may be prevented.

Figure 15A:
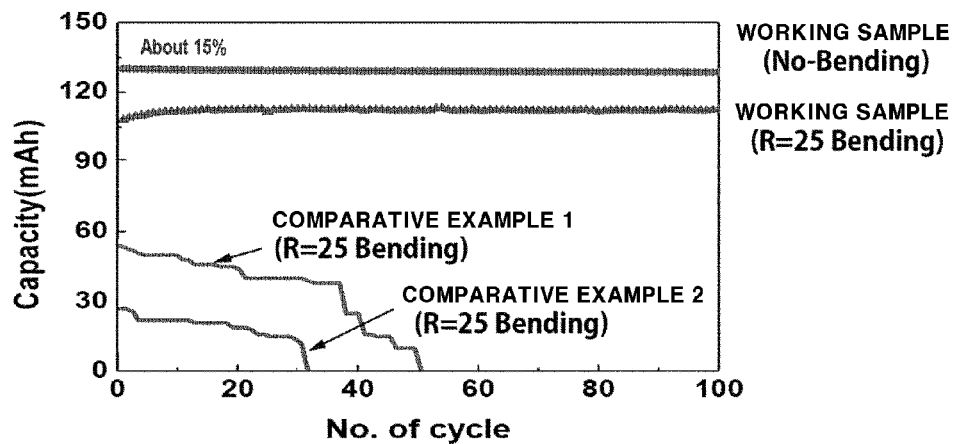
Figure 15B:
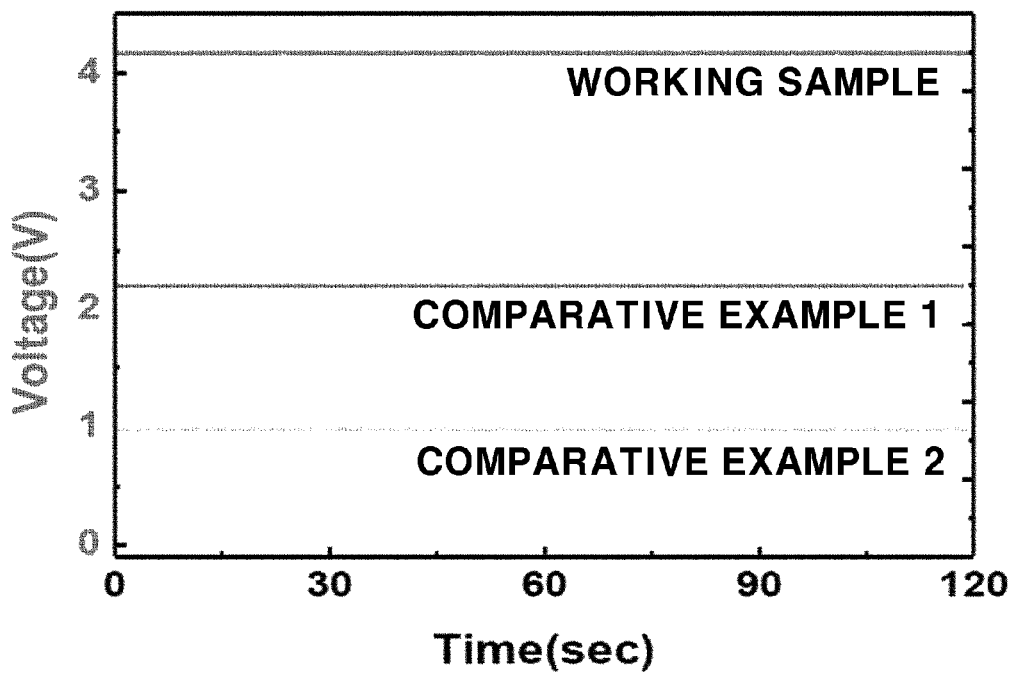

This may be seen in graphs of FIGS. 15A and 15B.

That is, as illustrated in FIG. 15A, when a force was applied to both end portions of the flexible battery such that a curvature of a bent portion became 25 mm and charging and discharging was performed one hundred times at a temperature of 25° C. and a humidity of 65%, in the case in which the patterns were formed on all of the electrode assembly 121 and the exterior members 127 and 128, a capacity of the battery was 110 mAh, which was decreased by approximately 15% compared to 130 mAh, which is the capacity of the battery when bending is not performed, and performance of the flexible battery was maintained even when charging and discharging was performed one hundred times (Working Sample), but in the case of a flexible battery in which the patterns for contraction and relaxation were formed on only an exterior member, it was seen that a capacity thereof gradually decreased from 52 mAh, which was a capacity decreased by approximately 60% compared to an initial capacity thereof, and charging and discharging was impossible when charging and discharging was performed more than fifty times (Comparative Example 1), and in the case of a flexible battery formed in a simple plate shape in which the patterns were not formed on all of exterior members and an electrode assembly, a capacity of the battery decreased to 26 mAh, which was a capacity decreased by approximately 80% compared to an initial capacity thereof, and charging and discharging was impossible when charging and discharging was performed more than thirty times (Comparative Example 2).

Meanwhile, as illustrated in FIG. 15B, when a voltage of the battery was measured over time after a longitudinal middle of the flexible battery was completely folded and restored at a temperature of 25° C. and a humidity of 65%, a voltage value of the battery was not changed in the case in which the patterns were formed on all of the electrode assembly 121 and the exterior members 127 and 128 (Working Sample), but voltage values of the batteries were decreased in the case of the flexible battery in which the patterns for contraction and relaxation were formed on only the exterior member (Comparative Example 1) and in the case of the flexible battery having the simple plate shape in which the patterns were not formed on all of the exterior members and the electrode assembly (Comparative Example 2).

In other words, it was seen that in the case in which the patterns 126 and 129 for contraction and relaxation were formed to coincide with each other on the exterior members 127 and 128 and the electrode assembly 121, performance was not significantly degraded even when the battery was bent, but in the case in which the patterns were formed on only the exterior members or in the case in which the patterns were not formed on all of the exterior members and the electrode assembly, cracks occurred or an electrolyte leaked due to bending, and thus performance as a battery was degraded.

As is described above, since the flexible battery applied to the present invention is formed such that the patterns 126 and 129 for contraction and relaxation in the longitudinal direction when the battery 120 is bent are formed to coincide with each other on the electrode assembly 121 and the exterior members 127 and 128, a uniform distance or contact state is maintained over the overall length of the electrode assembly 121 and the exterior members 127 and 128 even when bending occurs in the longitudinal direction, and the electrolyte encapsulated along with the electrode assembly 121 is uniformly distributed over the overall length thereof, and thus performance degradation of the battery may be prevented.

In this case, the pattern may be entirely or partially formed on the flexible battery.

As one example, in the case in which the flexible battery is integrally formed and is embedded in both the cover portion 114 and the rear portion 112, the pattern for contraction and relaxation may be formed in a region of the flexible battery corresponding to a folding region 115 between the cover portion 114 and the rear portion 112 in a direction parallel to a transverse direction of the rear portion 112 or the cover portion 114 (see FIG. 7).

Accordingly, even when the folding region 115 is repeatedly bent while the upper portion of the accommodation portion S is opened and closed by using the cover portion 114, an amount of a change of length generated during the bending may be cancelled through the pattern, and damage to or performance degradation of the flexible battery may be prevented.

As another example, when the integrally formed flexible battery is embedded in the bottom portion 113 and at least one of the front portion 111 and the rear portion 112, the pattern for contraction and relaxation may also be formed in a region in the overall length of the flexible battery disposed on a boundary region between the bottom portion 113 and the front portion 111 or between the bottom portion 113 and the rear portion 112 in a direction parallel to a transverse direction of the front portion 111 or the rear portion 112.

As still another example, when the integrally formed flexible battery is embedded in both the front portion 171a and the rear portion 171b of the device accommodation member 170, the pattern for contraction and relaxation may also be formed in a region in the overall length of the flexible battery disposed on a boundary region between the front portion 171a and the rear portion 171b in a direction parallel to a transverse direction of the front portion 171a or the rear portion 171b.

Accordingly, even when the region of the flexible battery disposed at the boundary region is bent, the region is protected by the pattern, and thus damage to or performance degradation of the flexible battery may also be prevented.

In this case, in the first pattern 129 and the second pattern 126, mountain portions and valley portions may be formed in a direction parallel to a transverse direction of the exterior members 127 and 128 and the electrode assembly 121, and the mountain portions and the valley portions may be alternately disposed in a longitudinal direction of the exterior members 127 and 128 and the electrode assembly 121 (see FIG. 13). In addition, in the mountain portions and the valley portions forming the first pattern 129 and the second pattern 126, the mountain portions may be formed at the same positions as each other and the valley portions may be formed at the same positions as each other such that the first pattern 129 and the second pattern 126 may be formed to match each other. In addition, the patterns 126 and 129 may be continuously or discontinuously formed in a direction parallel to the transverse direction of the electrode assembly 121 and the exterior members 127 and 128, and may be entirely or partially formed on the overall length of the electrode assembly 121 and exterior members 127 and 128.

Here, the mountain portions and the valley portions may be formed to have an arc type cross-section including a semicircular cross-section, a polygonal cross-section including a triangular or square cross-section, or a cross-section in various shapes in which the arc type cross-section and the polygonal cross-section are combined, and the mountain portions and the valley portions may have the same pitch and the same width but may also have different pitches and widths. In addition, the first pattern 129 and the second pattern 126 may be formed such that distances between adjacent mountain portions or distances between adjacent valley portions are the same or different or to have a combination of the same distances and different distances therebetween.

The electrode assembly 121, which is encapsulated in the exterior members 127 and 128 along with an electrolyte, includes a positive electrode 122, a negative electrode 124, and a separator 123 (see FIG. 14).

The positive electrode 122 may include a positive current collection body 122a and a positive electrode active material 122b, the negative electrode 124 may include a negative current collection body 124a and a negative electrode active material 124b, and each of the positive current collection body 122a and the negative current collection body 124a may be formed in a shape of a plate sheet having a predetermined area.

That is, the positive electrode 122 and the negative electrode 124 may be formed such that the active materials 122b and 124b may be respectively compressed on, deposited on, or applied to one or both surfaces of the current collection bodies 122a and 124a. Here, the active materials 122b and 124b may be respectively provided on entire areas of the current collection bodies 122a and 124a or on a portion thereof.

In addition, the positive current collection body 122a and the negative current collection body 124a may respectively include a positive electrode terminal 125b and a negative electrode terminal 125a for electrically connecting the positive current collection body 122a and the negative current collection body 124a to an external device. Here, the positive electrode terminal 125b and the negative electrode terminal 125a respectively extend from the positive current collection body 122a and the negative current collection body 124a to protrude from one side of the exterior members 127 and 128 or to be exposed from surfaces of the exterior members 127 and 128.

In this case, the positive electrode active material 122b and the negative electrode active material 124b may contain Polytetrafluoroethylene (PTFE). This is for preventing delamination of the positive electrode active material 122b and the negative electrode active material 124b from the current collection bodies 122a and 124a or the occurrence of cracks when the flexible battery is bent.

Meanwhile, the separator 123 interposed between the positive electrode 122 and the negative electrode 124 may include a nanofiber web layer 123*b* formed on one or both surfaces of a non-woven fabric layer 123*a*.

Here, the nanofiber web layer 123*b* may be a nanofiber containing one or more kinds of nanofiber selected from a polyacrylonitrile nanofiber and a polyvinylidene fluoride nanofiber.

Preferably, the nanofiber web layer 123*b* may be formed of only the polyacrylonitrile nanofiber for securing a radial property and for forming uniform pores.

The exterior members 127 and 128 are each formed as a plate-shaped member having a predetermined area, and accommodate the electrode assembly 121 and an electrolyte there inside to protect the electrode assembly 121 from an external force.

To this end, the exterior members 127 and 128 are provided as a pair of the first exterior member 127 and the second exterior member 128 and are sealed along edges thereof by an adhesive to prevent leakage and exposure of the electrolyte and the electrode assembly 121 to the outside.

The exterior members 127 and 128 may be formed as two members, that are the first exterior member 127 and the second exterior member 128, the edges thereof forming a sealing portion may be sealed by the adhesive, or the exterior members 127 and 128 may also be integrally formed and folded in half in the transverse or longitudinal direction thereof and edge portions in contact with each other may be sealed by the adhesive.

Meanwhile, the battery 120 may be recharged for reuse. That is, the battery 120 may be recharged through one method of the wired method and the wireless method, or may be recharged through both the wired method and the wireless method.

As one example, as a charging port (not shown) for electrical connection with an external charging device is separately formed on the accommodation main body 110 or the device accommodation member 170 to be electrically connected to the circuit portion 130, power supplied from the external charging device may be supplied by a charging cable through the wired method to recharge the battery 120.

As another example, the battery 120 may be recharged through the wireless method.

That is, a wireless power receiving antenna for wirelessly receiving power transmitted from the outside through a known magnetic induction method or magnetic resonance method may be included in the accommodation main body 110 or the device accommodation member 170.

In this case, although the wireless power receiving antenna for recharging the battery 120 may be separately provided along with the wireless power transfer antenna 150, the wireless power transfer antenna 150 may be used as the wireless power receiving antenna for receiving wireless power supplied from an external charging device.

That is, the wireless power transfer antenna 150 may be one antenna serving as a wireless power transmitting antenna or a wireless power receiving antenna according to a purpose of use.

In other words, the wireless power transfer antenna 150 may be used as a wireless power transmitting antenna to operate in the transmitting mode to charge the main battery of the portable terminal by using the power stored in the battery 120, or may be used as a wireless power receiving antenna to operate in the receiving mode to charge the battery 120 by receiving wireless power from the external charging device.

That is, in the case in which the wireless power transfer antenna 150 is in close proximity to a portable electronic device including a wireless power receiving module, the wireless power transfer antenna 150 is switched to be a wireless power transmitting antenna to be used in the wireless power transmitting mode, and in the case in which the wireless power transfer antenna 150 is in close proximity to a wireless power transmission module, the wireless power transfer antenna 150 is switched to be a wireless power receiving antenna to be used in the wireless power receiving mode.

In addition, the wireless power transfer antenna 150 may be switched from the transmitting mode in which the wireless power transfer antenna 150 operates as a wireless power transmitting antenna for charging a main battery of a portable electronic device to the receiving mode in which the wireless power transfer antenna 150 operates as a wireless power receiving antenna for charging the battery 120.

Here, in the case in which the wireless power transfer antenna 150 operates in the transmitting mode, the portable electronic device 10 may be in a state in which the portable electronic device 10 is inserted into the device fixing portion 116 or 172, and in the case in which the wireless power transfer antenna 150 operates in the receiving mode, the device fixing portion 116 or 172 may be in a state in which an external charging device is inserted into the device fixing portion 116 or 172.

As one example, in the case in a state in which the wireless power transfer antenna 150 operates in the transmitting mode and in which a portable electronic device including a wireless power receiving antenna is in close proximity to the wireless power transfer antenna 150, the main battery of the portable electronic device may be charged, and in the case in a state in which the wireless power transfer antenna 150 operates in the transmitting mode and in which a charging device including a wireless power transmission module having a wireless power transmitting antenna is in close proximity to the wireless power transfer antenna 150, the wireless power transfer antenna 150 may be switched from the transmitting mode to the receiving mode to charge the battery 120.

In this case, although the wireless power transfer antenna 150 may be switched between the receiving mode and the transmitting mode by operating a switch, the mode of the wireless power transfer antenna 150 may also be switched by the circuit portion 130.

As one example, in the case in which a portable electronic device is in close proximity to the wireless power transfer antenna 150, the circuit portion 130 may switch the wireless power transfer antenna 150 to be a wireless power transmitting antenna, and in the case in which an external charging device is in close proximity to the wireless power transfer antenna 150, the circuit portion 130 may switch the wireless power transfer antenna 150 to be a wireless power receiving antenna.

In addition, in the case in which an external charging device is in close proximity to the wireless power transfer antenna 150 when the wireless power transfer antenna 150 operates in the transmitting mode to charge the main battery of the portable electronic device, the circuit portion 130 may switch the wireless power transfer antenna 150 from the transmitting mode to the receiving mode.

Specifically, in the case in which power is supplied to the circuit portion 130, the wireless power transfer antenna 150 operates in the transmitting mode in which the wireless power transfer antenna 150 serves as a wireless power transmitting antenna, and a power signal for detecting whether a wireless power receiving module is in close proximity to the wireless power transfer antenna 150 may be transmitted to the outside with a predetermined period through the wireless power transfer antenna 150 under the control of the circuit portion 130.

In this case, while the wireless power transfer antenna 150 transmits the power signal, in the case in which an inductance of the wireless power transfer antenna 150 changes and another power signal transmitted from the outside is not detected, the battery of a portable electronic device is charged to consume power stored in the battery 120 by controlling an amount of power according to a load required by the portable electronic device.

In addition, when the wireless power transfer antenna 150 transmits the power signal with the predetermined period through the wireless power transfer antenna 150 in state in which the wireless power transfer antenna 150 operates in the transmitting mode, as described above, in the case in which the inductance of the wireless power transfer antenna 150 changes and another power signal transmitted from the outside is detected by the circuit portion 130, as the circuit portion 130 recognizes that an external charging device including a wireless power transmission module is in close proximity to the wireless power transfer antenna 150, the wireless power transfer antenna 150 is switched to the receiving mode.

Accordingly, as the battery 120 receives wireless power, which is transmitted from the wireless power transmission module of the external charging device, through the wireless power transfer antenna 150, the battery 120 is charged.

Figure 3:
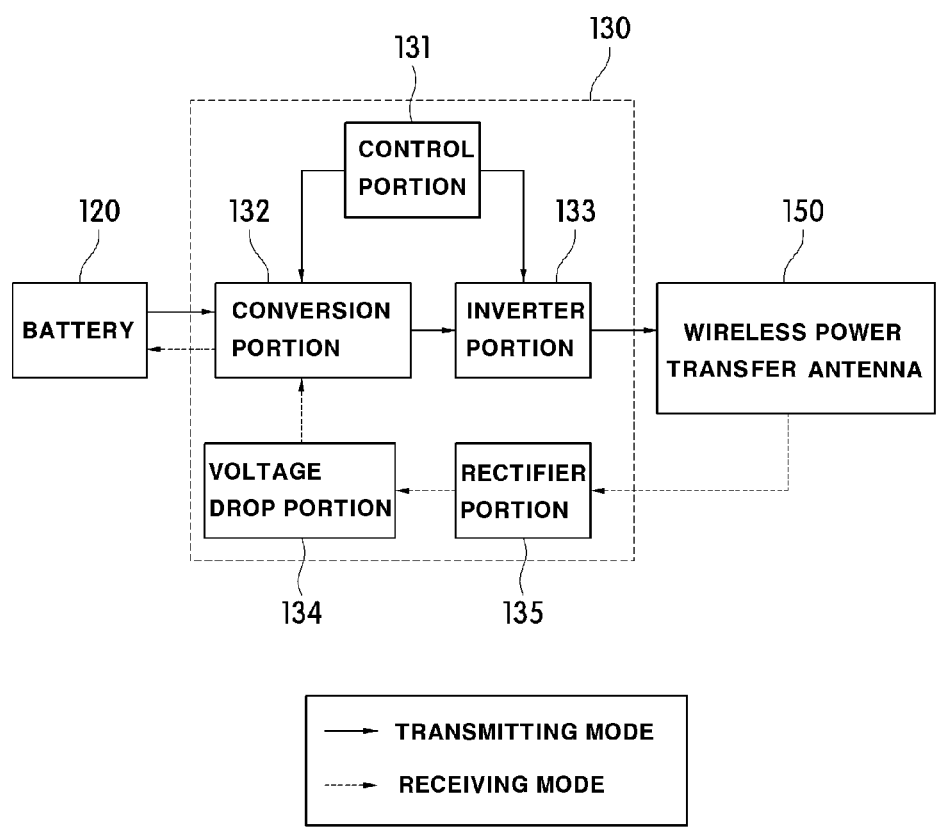
FIG. 3 is a schematic view illustrating a detailed configuration of a circuit portion applied to the portable article container according to the present invention.

To this end, the circuit portion 130 may include various circuits for operating the wireless power transfer antenna 150 in the receiving mode and the transmitting mode (see FIG. 3).

As one example, the circuit portion 130 may include the control portion 131 configured to generate a control signal for controlling overall operation of the circuit portion 130 and adjusting a frequency, a voltage, current characteristics and the like used for generating the power signal transmitted from the wireless power transfer antenna 150.

Here, the control portion 131 may generate a control signal for performing a process of recognizing a wireless power receiving module and a wireless power transmission module, determining whether transmission of wireless power should be started, or switching a mode of the wireless power transfer antenna 150 from the transmitting mode to the receiving mode according to a result of detecting the presence of the wireless power receiving module and the wireless power transmission module.

In addition, the circuit portion 130 may include a conversion portion 132 configured to convert power provided from the battery 120 into a predetermined voltage and current or to convert power received through the wireless power transfer antenna 150 into a predetermined voltage and current suitable for the battery 120 to provide the predetermined voltage and current to the battery 120.

In addition, the circuit portion 130 may include the inverter portion 133 for converting DC power supplied from the battery 120 into AC power, a rectifier portion 135 for converting AC power which is external power received through the wireless power transfer antenna 150 to DC power, and the voltage drop portion 134 for dropping the DC power converted by the rectifier portion 135 to a voltage suitable for the battery 120.

Here, the control portion 131 may be a known micro controller unit (MCU) and may use a pulse width modulation (PWM) control method, and the voltage drop portion 134 may use one method of a low-dropout (LDO) method and a buck method. In addition, the circuit portion 130 may include a protection circuit such as a PCM circuit and the like for preventing over charging or protecting various circuits.

In addition, the circuit portion 130 may further include a switching circuit configured to switch the wireless power transfer antenna 150 to perform a function of a wireless power transmission module when a wireless power receiving module is in close proximity to the wireless power transfer antenna 150 or to switch the wireless power transfer antenna 150 to perform a function of a wireless power receiving antenna when a wireless power transmission module is in close proximity to the wireless power transfer antenna 150.

Accordingly, each of the portable article containers 100 and 200 according to the present invention may operate in the transmitting mode for charging a main battery of a portable electronic device by using the power stored in the battery 120 or in the receiving mode for receiving wireless power supplied from an external charging device to charge the battery 120 under the control of the circuit portion 130.

As one example, when the power of the battery 120 is supplied to the circuit portion 130, the wireless power transfer antenna 150 operates in the transmitting mode as a power signal generated by the control portion 131 is transmitted to the outside with a predetermined period.

Here, the power supplied from the battery 120 may be converted into the predetermined voltage and current by the conversion portion 132 and supplied to the control portion 131, DC power is converted into AC power by the inverter portion 133, and the AC power is supplied to the wireless power transfer antenna 150, and thus a power signal having the predetermined period is transmitted to the outside.

Then, while the wireless power transfer antenna 150 transmits the power signal, in the case in which an induction of the wireless power transfer antenna 150 is changed due to an interaction between the wireless power transfer antenna 150 and a receiving antenna of a wireless power receiving module included in a portable electronic device and another power signal is not detected, the main battery of a portable electronic device is charged to consume power stored in the battery 120 by controlling an amount of power according to a load required by the wireless power receiving module of the portable electronic device through the circuit portion 130.

Meanwhile, in the case in which it is necessary to charge the battery 120, as a charging device including a wireless power transmission module is brought into close proximity with the portable article container 100, charging of the battery 120 may be performed through the wireless method.

That is, the charging device is brought into close proximity with the wireless power transfer antenna 150 in a state in which the wireless power transfer antenna 150 is operated by the circuit portion 130 in the transmitting mode in which the wireless power transfer antenna 150 transmits the power signal with the predetermined period. Accordingly, the inductance of the wireless power transfer antenna 150 is changed due to an interaction between the wireless power transfer antenna 150 and a wireless power transmitting antenna of the wireless power transmission module included in the charging device. In addition, when another power signal transmitted from the charging device is detected by the control portion 131, the control portion 131 recognizes that the charging device is in close proximity to the wireless power transfer antenna 150 and blocks the supply of power to the inverter portion 133, and thus the wireless power transfer antenna 150 is switched to the receiving mode in which the wireless power transfer antenna 150 operates as a wireless power receiving antenna.

Here, the control portion 131 may provide the charging device with at least one piece of information among information on an amount of power, charging state information, power information suitable for a load required by an object to be charged, and identification information about a state of the battery 120.

Accordingly, the wireless power transfer antenna 150 which operates in the receiving mode receives wireless power supplied from the charging device wherein the wireless power is suitable for the battery 120 to charge power of the battery 120.

Here, AC power, which is the power received through the wireless power transfer antenna 150, may be converted into DC power by the rectifier portion 135, the DC power may be converted into a voltage of a level suitable for the battery 120 by the voltage drop portion 134, and then the conversion portion 132 may supply a predetermined voltage and current to charge the battery 120 and thus power of the battery 120 may be charged.

Accordingly, the portable article containers 100 and 200 according to the present invention may wirelessly transmit and receive power to charge a main battery of a portable electronic device or to charge power of the battery 120, and thus ease of use may be improved.

In addition, in the case in which charging and discharging of the battery 120 are performed only through the wireless method, since a port, which is a necessary component for connecting a cable in a conventional wired charging and discharging method, is omitted, a failure due to a permeation of foreign material and moisture into the port may be prevented, and thus a service life of the battery may be extended.

Figure 2:
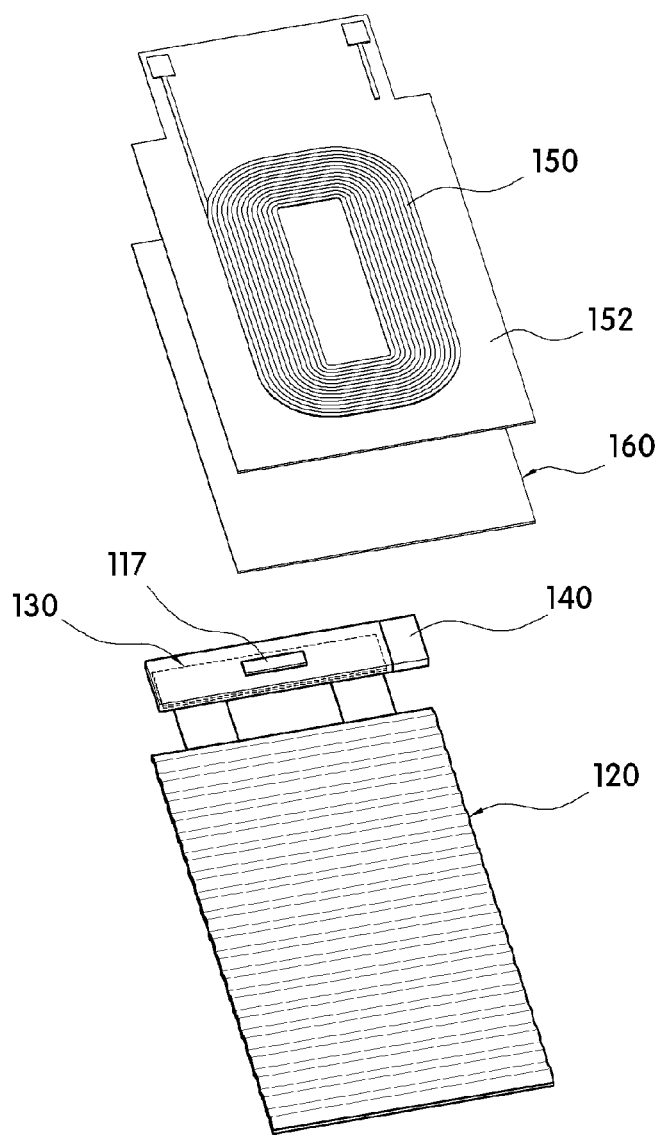
FIG. 2 is a view illustrating an arrangement relation of a battery, a wireless power transfer antenna, and a shielding sheet which are applied to the present invention.

Meanwhile, a shielding sheet 160 for increasing a transmission efficiency of the wireless power transfer antenna 150 may be disposed on one surface of the wireless power transfer antenna 150. As illustrated in FIG. 2, the shielding sheet 160 may be formed as a plate-shaped member in a having a predetermined area.

The shielding sheet 160, which is formed of a magnetic material, performs a function of shielding a magnetic field generated by the wireless power transfer antenna 150 and focusing the magnetic field in a required direction, may be formed of various known materials.

As one example, the shielding sheet may use a ribbon sheet including at least one kind of amorphous alloy and nanocrystalline alloy, a ferrite sheet, a polymer sheet, or the like.

Here, the ferrite sheet may be a Mn—Zn ferrite or Ni—Zn ferrite, and the amorphous alloy or the nanocrystalline alloy may use a Fe-based or Co-based magnetic alloy.

In addition, the shielding sheet 160 may be formed as a plurality of separate fine pieces which are flaked to suppress the generation of an eddy current, and may also be formed as a multi-layer structure to increase permeability thereof.

Figure 4:
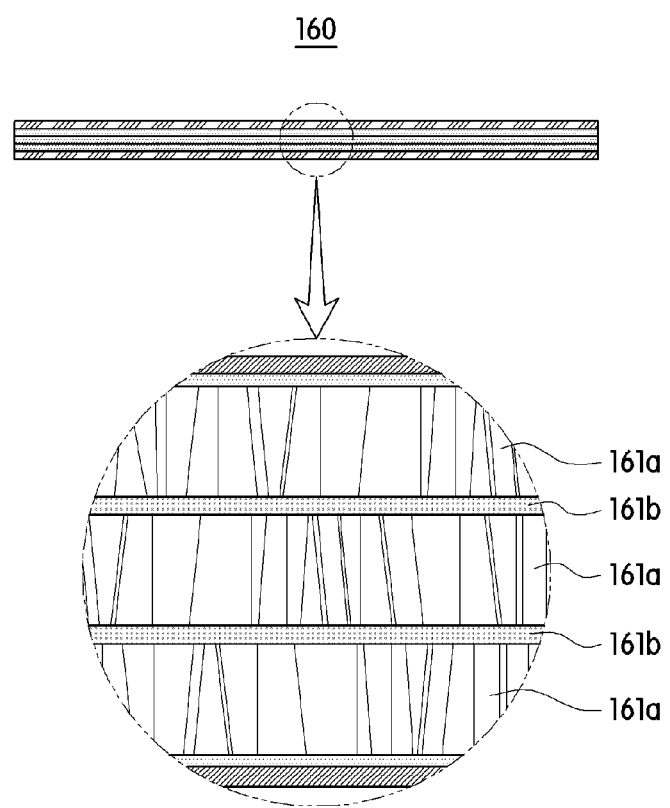
FIG. 4 is a detail view illustrating one form of the shielding sheet applied to the portable article container according to the present invention.
Figure 5:
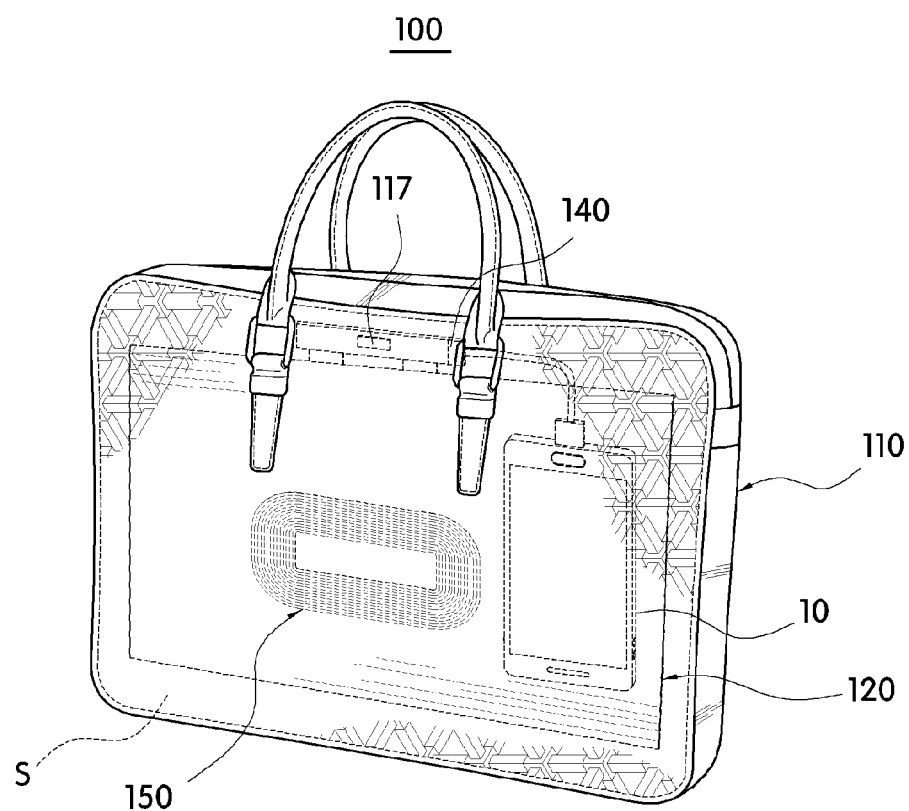
FIG. 5 is a view illustrating a usage state in which a portable electronic device is charged through a wired method by using a portable article container according to one embodiment.

As one example, as illustrated in FIG. 4, the shielding sheet 160 may include a plurality of ribbon sheets 161a including at least one kind of amorphous alloy and nanocrystalline alloy, the plurality of ribbon sheets may be stacked in a multi-layer via adhesive layers 161b, and the ribbon sheets may be formed as a plurality of separate fine pieces. In addition, the plurality of fine pieces may be totally or partially insulated between adjacent fine pieces, and each of the fine pieces may be randomly formed in an atypical shape.

Since the shielding sheet 160 has a known structure, a detailed description thereof will be omitted, and any known shielding sheet may be used as the shielding sheet.

Meanwhile, the portable article container according to the present invention may include the connection port 140 for wired charging and the wireless power transfer antenna 150 for the wireless charging method, may also include only the connection port 140 as a charging unit such that a main battery of a portable electronic device may be charged through only the wired charging method, and may also include only the wireless power transfer antenna 150 as a charging unit such that the main battery of the portable electronic device may be charged through only the wireless charging method.

In addition, in the case in which the wireless power transfer antenna 150 applied to the present invention serves as both a wireless power receiving antenna and a wireless power transmitting antenna, the connection port 140 for charging a main battery of a portable terminal may be or may not be included in the portable article container.

In addition, in the case in which the portable article container according to the present invention includes both the wireless power transfer antenna 150 and the connection port 140 as charging units, the connection port 140 may serve to charge a main battery of a portable electronic device, and the wireless power transfer antenna 150 may serve as a wireless power receiving antenna to charge the battery 120 embedded in the accommodation main body 110 through the wireless method.

While embodiments of the present invention have been described above, the scope of the present invention is not limited thereto. It should be understood by those skilled in the art that various changes due to addition, modification, deletion, and the like of components may be easily made without departing from the spirit and scope of the present invention, and such changes are also included in the range of the scope of the present invention.

What is claimed:

1. A portable article container comprising:
   an accommodation main body which is portable and includes an accommodation portion configured to accommodate an article;
   a battery configured to provide power to charge a main battery of a portable electronic device; and
   at least one charging unit configured to transmit power stored in the battery to the portable electronic device through at least one method of a wireless method and a wired method,
   wherein the battery is a flexible battery having flexibility;
   wherein the flexible battery includes an electrode assembly having a positive electrode, a negative electrode, and a separator, and an exterior material including a first exterior material and a second exterior material which are provided in a pair and configured to encapsulate the electrode assembly and an electrolyte, and
   patterns formed on each of the exterior material and the electrode assembly to cancel out the amount of change of a basic material itself while being bent,
   wherein the patterns include a first pattern formed on the exterior material and a second pattern formed on the electrode assembly,
   wherein the first pattern includes a plurality of peaks and valleys which are alternatively formed along a longitudinal direction of the exterior material,
   wherein the second pattern includes a plurality of peaks and valleys which are alternatively formed along a longitudinal direction of the electrode assembly, and wherein the first pattern and the second pattern are disposed such that peaks and valleys are formed to be coincident with each other.

2. The portable article container of claim 1, wherein the patterns are entirely or partially formed over an overall length of the battery.

3. A portable article container comprising:

an accommodation main body including an accommodation portion configured to accommodate an article;

a flexible battery configured to supply power to charge a main battery of a portable electronic device;

a wireless power transfer antenna which serves as an antenna configured to transmit or receive wireless power; and a circuit portion configured to control driving of the wireless power transfer antenna, wherein the wireless power transfer antenna uses one antenna to receive wireless power supplied from an outside to charge power of the battery or to transmit the power stored in the battery to charge the main battery of the portable electronic device through a wireless method, wherein the battery is a flexible battery having flexibility;

wherein the flexible battery includes an electrode assembly having a positive electrode, a negative electrode, and a separator, and an exterior material including a first exterior material and a second exterior material which are provided in a pair and configured to encapsulate the electrode assembly and an electrolyte, and patterns formed on each of the exterior material and the electrode assembly to cancel out the amount of change of a basic material itself while being bent, wherein the patterns include a first pattern formed on the exterior material and a second pattern formed on the electrode assembly, wherein the first pattern includes a plurality of peaks and valleys which are alternatively formed along a longitudinal direction of the exterior material, wherein the second pattern includes a plurality of peaks and valleys which are alternatively formed along a longitudinal direction of the electrode assembly, and wherein the first pattern and the second pattern are disposed such that peaks and valleys are formed to be coincident with each other.

4. The portable article container of claim 3, wherein the flexible battery is embedded in the accommodation main body or is embedded in a device accommodation member which has an accommodation space configured to accommodate the portable electronic device and is disposed in the accommodation portion.

* * * * *